United States Patent
Satou et al.

(10) Patent No.: US 10,054,671 B2
(45) Date of Patent: Aug. 21, 2018

(54) ON-VEHICLE RADAR APPARATUS CAPABLE OF RECOGNIZING RADAR SENSOR MOUNTING ANGLE

(71) Applicant: DENSO CORPORATION, Kariya, Aichi-pref. (JP)

(72) Inventors: Miki Satou, Kariya (JP); Yasuyuki Miyake, Toyota (JP); Gaku Takano, Yokohama (JP); Koichiro Suzuki, Yokohama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 271 days.

(21) Appl. No.: 14/767,251

(22) PCT Filed: Feb. 6, 2014

(86) PCT No.: PCT/JP2014/052718
§ 371 (c)(1),
(2) Date: Aug. 11, 2015

(87) PCT Pub. No.: WO2014/125981
PCT Pub. Date: Aug. 21, 2014

(65) Prior Publication Data
US 2016/0011299 A1    Jan. 14, 2016

(30) Foreign Application Priority Data
Feb. 12, 2013  (JP) .................. 2013-024627

(51) Int. Cl.
*G01S 7/40*    (2006.01)
*G01S 13/34*   (2006.01)
(Continued)

(52) U.S. Cl.
CPC ............ *G01S 7/4026* (2013.01); *G01S 13/34* (2013.01); *G01S 13/584* (2013.01); *G01S 13/931* (2013.01); *G01S 2007/403* (2013.01)

(58) Field of Classification Search
CPC ............ G01S 7/4026; G01S 2007/403; G01S 2007/4034
See application file for complete search history.

(56) References Cited

U.S. PATENT DOCUMENTS 5,832,407 A    11/1998    Kai et al.
5,977,906 A *  11/1999    Ameen ................. G01S 7/4026
                                                 342/165
(Continued)

FOREIGN PATENT DOCUMENTS

JP    H09-236659 A    9/1997
JP    H09-250970 A    9/1997
(Continued)

OTHER PUBLICATIONS

International Search Report (translated version); International Application No. PCT/JP2014/052718, filed Feb. 6, 2014; 5 pages.
(Continued)

*Primary Examiner* — Peter M Bythrow
(74) *Attorney, Agent, or Firm* — Knobbe, Martens, Olson & Bear, LLP

(57) ABSTRACT

An on-vehicle radar apparatus includes a radar sensor and a mounting angle calculation section that calculates a mounting angle of the radar sensor, and the radar sensor is mounted on a vehicle so that a sensing area includes a direction of 90 degrees relative to a front-back direction of the vehicle and detects a relative speed to an observation point at which the radar wave is reflected in the sensing area and an azimuth at which the observation point is located. The mounting angle calculation section calculates a mounting angle of the radar sensor from an azimuth of a speed zero observation point, (Continued)

the speed zero observation point being the observation point with a relative speed of zero.

6 Claims, 4 Drawing Sheets

(51) Int. Cl.
*G01S 13/58* (2006.01)
*G01S 13/93* (2006.01)

(56) References Cited

U.S. PATENT DOCUMENTS

| | | | |
|---|---|---|---|
| 6,025,797 | A | 2/2000 | Kawai et al. |
| 6,246,949 | B1 | 6/2001 | Shirai et al. |
| 2002/0138223 | A1 | 9/2002 | Schneider et al. |
| 2003/0034913 | A1 | 2/2003 | Asanuma et al. |
| 2007/0115169 | A1 | 5/2007 | Kai et al. |
| 2008/0012752 | A1 | 1/2008 | Okamura et al. |
| 2010/0238066 | A1* | 9/2010 | Lohmeier ............ G01S 7/10 342/70 |
| 2011/0068970 | A1 | 3/2011 | Mitsumoto |

FOREIGN PATENT DOCUMENTS

| | | |
|---|---|---|
| JP | H09-281239 A | 10/1997 |
| JP | H11-094943 A | 4/1999 |
| JP | H11-94943 A | 4/1999 |
| JP | 2001-166051 A | 6/2001 |
| JP | 2002-228749 A | 8/2002 |
| JP | 2003-057334 A | 2/2003 |
| JP | 2003-531383 A | 10/2003 |
| JP | 2007-003395 A | 1/2007 |
| JP | 2007-139690 A | 6/2007 |
| JP | 2011-002346 A | 1/2011 |
| JP | 2011-064624 A | 3/2011 |
| WO | 2006/051603 A1 | 5/2006 |
| WO | WO 06/051603 A1 | 5/2006 |
| WO | 2014/125981 A1 | 8/2014 |

OTHER PUBLICATIONS

International Preliminary Report on Patentability; International Application No. PCT/JP2014/052718; Filed: Feb. 6, 2014 (with English translation).
Notification of Reasons for Rejection; Japanese Patent Application No. 2013-024627; Filed: Feb. 12, 2013 (with English translation).

* cited by examiner

ON-VEHICLE RADAR APPARATUS CAPABLE OF RECOGNIZING RADAR SENSOR MOUNTING ANGLE

CROSS-REFERENCE TO RELATED APPLICATION

This application is based on and claims the benefit of priority from earlier Japanese Patent Application No. 2013-24627 filed Feb. 12, 2013, the description of which is incorporated herein by reference.

BACKGROUND

Technical Field

The present disclosure relates to a radar apparatus, and specifically relates to an on-vehicle radar apparatus mounted on a vehicle to detect various targets around the vehicle.

Background Art

Conventionally, on-vehicle radar apparatuses are used to detect various targets around the vehicle and sense a risk of collision of the vehicle and the target. Such on-vehicle radar apparatuses may erroneously detect a position of target if an optical axis deviation occurs, that is, when an optical axis of a radar wave (e.g., millimeter wave, laser beam, ultrasonic wave) is deviated from a predetermined mounting direction (for example, a front-back direction of the vehicle) due to some reasons (such as changes over time). The optical axis as used herein is an axis which extends through the center of a sensing area of the on-vehicle radar apparatus.

As a technique to detect such an optical axis deviation, JP-A-H9-250970 discloses a technique using the azimuth dependence of relative speed to a stationary object.

Specifically, when a relative speed of the stationary object observed by the radar is Vs, an own vehicle speed is Vh, and an azimuth at which a target exists is $\theta$ (the azimuth in the radar coordinate system on the basis of the optical axis), they have a relationship expressed by the following equation (1), where a parameter A is a ratio of speed errors contained in the own vehicle speed Vh and the relative speed Vs, and A=1 represents a case in which no error exists.

[Math. 1]

$$\frac{Vs}{Vh} = A \cdot \cos(\theta) \quad (1)$$

When the optical axis deviation (an angle of the optical axis relative to the mounting direction) is $\alpha$, an apparent azimuth (an azimuth in the vehicle coordinate system on the basis of the mounting direction) $\theta'$ is expressed as $\theta'=\theta-\alpha$. The detected relative speeds are the same regardless of presence or absence of optical axis deviation. When taking into consideration the optical axis deviation, the equation (1) can be replaced with an equation (2).

[Math. 2]

$$\frac{Vs}{Vh} = A \cdot \cos(\theta - \alpha) \quad (2)$$

That is, in a chart plotted with Vs/Vh and the azimuth angle measurement $\theta$, a peak value is obtained when $\theta=0$ if there is no optical axis deviation ($\alpha=0$) and the peak value is obtained when $\theta=\alpha$ if there is an optical axis deviation ($\alpha\neq 0$). Accordingly, the optical axis deviation amount is estimated as $\alpha$.

CITATION LIST

Patent Literature

[PLT 1] JP-A-H9-250970

Although the technique described in the above patent literature is achieved when the reflection point on the stationary object is located in a horizontal plane which includes the optical axis of the on-vehicle radar, the reflection point is not always located on the horizontal plane which includes the optical axis. Accordingly, it is difficult to accurately detect the optical axis deviation amount using this technique.

That is, when the reflection point is located out of the horizontal plane which includes the optical axis, there is a speed component in a vertical direction which corresponds to a vertical position of the reflection point (a distance from the horizontal plane) and the parameter A fails to be constant. As a result, an apparent peak is not obtained in the chart plotted with Vs/Vh. The influence becomes more remarkable when the on-vehicle radar has a wider vertical view angle.

Since the optical axis deviation is generated by the mounting angle of the on-vehicle radar apparatus (particularly, an antenna section) varying to the vehicle, the optical axis deviation amount can be obtained by obtaining the mounting angle by some technique.

SUMMARY

The present disclosure provides an on-vehicle radar apparatus which is capable of obtaining a mounting angle relative to a vehicle in a stable manner regardless of a height of observation point at which a radar wave is reflected.

The on-vehicle radar apparatus according to the present disclosure includes a radar sensor and a mounting angle calculation section. The radar sensor is mounted on a vehicle so that an azimuth of 90 degrees relative to a front-back direction of the vehicle is included in a sensing area, and transmits and receives a probe wave to detect at least a relative speed to an observation point at which a radar wave is reflected in the sensing area and an azimuth at which the observation point is located. The mounting angle calculation section calculates a mounting angle of the radar sensor from an azimuth of a speed zero observation point, the speed zero observation point being the observation point with a relative speed of zero among the observation points detected by the radar sensor.

That is, when an object which exist at the azimuth of 90 degrees (hereinafter, simply referred to as "90 degree azimuth") relative to the front-back direction (travelling direction) of the vehicle is not approaching to the vehicle, that is, when the object is a stationary object such as a wall or a vehicle travelling side by side with the vehicle, the object has only a speed component in the front-back direction of the vehicle. Since the object does not have a speed component in a direction of the radar apparatus (90 degree direction relative to the front-back direction of the vehicle), it is detected as a speed zero observation point regardless of a height of the reflection point. Accordingly, the azimuth at which the speed zero observation point is detected by the radar sensor can be identified as 90 degree azimuth, and thus a corresponding relationship between the vehicle coordinate system on the basis of the front-back direction of the vehicle and the radar coordinate system on the basis of the optical axis of the radar can be identified. As a result, according to the present disclosure, an actual mounting angle of the radar sensor relative to the vehicle can be obtained in a stable manner, and further, the optical axis deviation amount can be obtained from a difference between the actual mounting angle and a desired mounting angle.

DETAILED DESCRIPTION OF THE PREFERRED EMBODIMENTS

With reference to the drawings, embodiments of the present disclosure will be described.

<Overall Configuration>

Figure 1:
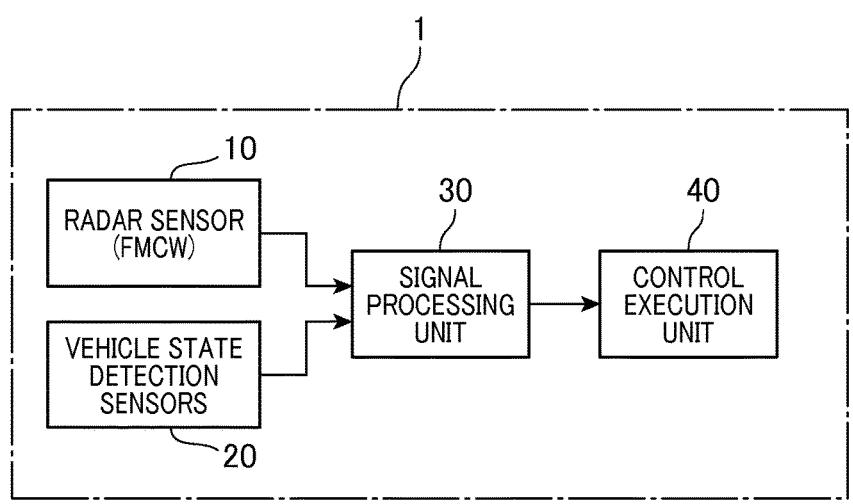
FIG. 1 is a block diagram showing an overall configuration of a vehicle control system.
Figure 2:
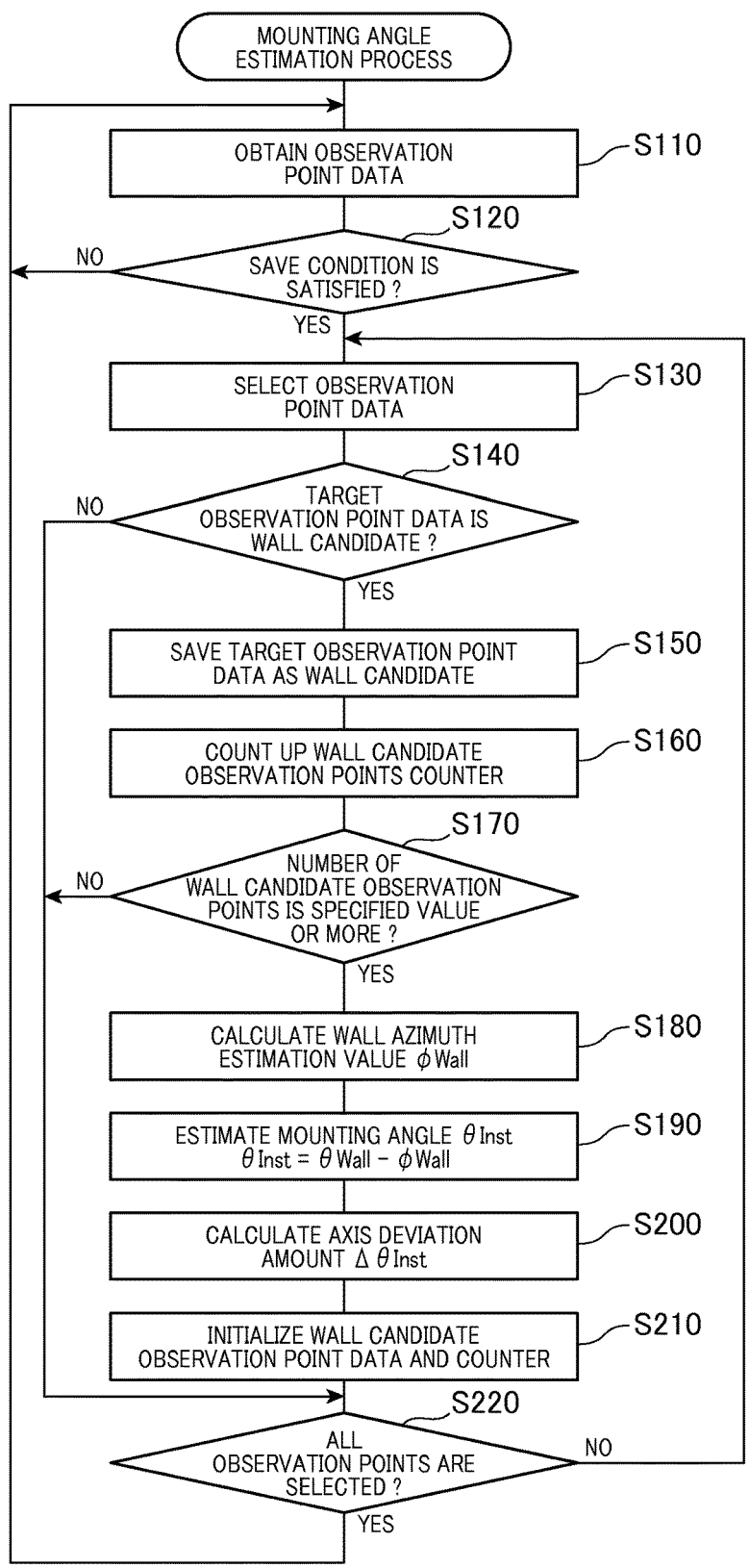
FIG. 2 is a flowchart of a mounting angle estimation process.

A vehicle control system 1 as shown in FIG. 1 is used to be mounted on a vehicle and includes a radar sensor 10, vehicle state detection sensors 20, a signal processing unit 30 and a control execution unit 40. The signal processing unit 30 is configured to communicate with the radar sensor 10, the vehicle state detection sensors 20 and the control execution unit 40. In the vehicle control system 1, a communication method between components is not specifically limited.

Figure 3:
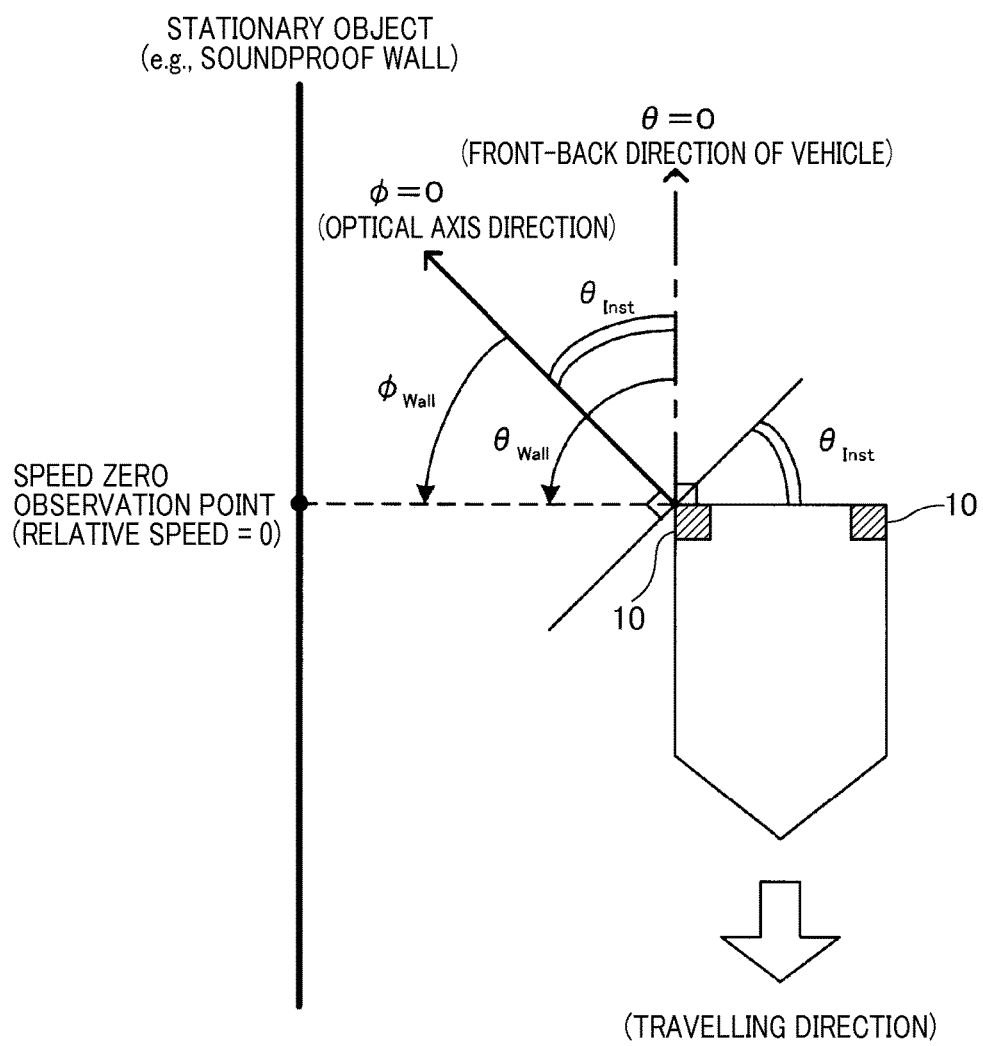
FIG. 3 is an explanatory view showing a mounting position of a radar sensor, a radar coordinate system and a vehicle coordinate system.

The radar sensors 10 are each mounted on the right and left ends of a rear part of an own vehicle (the vehicle in which the vehicle control system 1 is mounted) at a mounting angle in which each center axis of a sensing area of the radar sensor 10 (hereinafter, referred to as "optical axis") is oriented outward by a reference mounting angle (in this example, 40 degrees) relative to a front-back direction of the vehicle (the radar sensor 10 on the right end is oriented rightward and the radar sensor 10 on the left end is oriented leftward) (see FIG. 3). The sensing area is set to include a direction of 90 degrees relative to the front-back direction of the vehicle (hereinafter, referred to as "90 degree azimuth"). In this example, the sensing area covers a range of approximately ±90 degrees about the optical axis. Hereinafter, a coordinate system on the basis of the front-back direction of the vehicle is referred to as a vehicle coordinate system (in which an angle is expressed as $\theta$), while a coordinate system on the basis of the optical axis is referred to as a radar coordinate system (in which an angle is expressed as $\phi$). When the radar sensor 10 is mounted on the vehicle at a correct mounting angle, the radar coordinate system is rotated relative to the vehicle coordinate system by a reference mounting angle.

Further, the radar sensor 10 is constituted by a known frequency modulated continuous wave (FMCW) radar which uses a millimeter wave, and transmits and receives a radar wave (FMCW wave) by using an antenna array to detect a distance to a point at which the radar wave is reflected in the sensing area (hereinafter, referred to as "observation point"), a relative speed to the observation point, and an azimuth at which the observation point exists, and transmits those data as observation data to the signal processing unit 30. The radar wave is not limited to the FMCW wave, and any other modulation methods which can detect distance and azimuth of an object which does not have a relative speed may also be used.

The vehicle state detection sensors 20 are composed of a variety of sensors that detect a motion state of the vehicle, and at least include a vehicle speed sensor, yaw rate sensor and steering angle sensor. The sensors are not limited to the those sensors, and any other sensors which detect information necessary for determining the vehicle speed or determining whether the vehicle is travelling straight may also be used. The respective sensors which constitute the vehicle state detection sensors 20 transmit the detection result to the signal processing unit 30.

The signal processing unit 30 is an electronic control unit that integrally controls the vehicle control system 1, and is mainly formed of a known microcomputer which includes CPU, ROM, RAM and the like. The signal processing unit 30 detects a target which exists in the sensing area based on the observation point data received from the radar sensor 10, and at least performs a drive assist process which assists driver's driving operation based on the detected target, and a mounting angle estimation process which estimates a mounting angle of the radar sensor 10 based on the observation point data.

The control execution unit 40 executes audible and visual notification for a driver by using various on-vehicle equipment in response to a command from the signal processing unit 30 and a variety of vehicle controls necessary for drive assistance.

<Processing>

Next, a processing performed by the signal processing unit 30 will be described. A storage unit (for example, ROM) included in the signal processing unit 30 stores a program for performing the drive assist process, the mounting angle estimation process and the like.

Since the drive assist process is a known process, the explanation thereof is omitted. In the following description, the mounting angle estimation process will be described in detail.

The mounting angle estimation process starts upon startup of an engine of the own vehicle.

When the mounting angle estimation process starts, the signal processing unit 30 first obtains observation point data (a distance, relative speed, azimuth to the observation point) from the radar sensor 10 (S110).

Then, the signal processing unit 30 determines whether a save condition for saving the observation data as a wall candidate point data is satisfied (S120). Specifically, the own vehicle speed, steering angle and yaw rate are obtained from the detection result of the vehicle state detection sensors 20, and the save condition is determined as being satisfied when the own vehicle speed is not less than a lower limit speed (for example, 50 km/h) at which a stationary object and a moving object can be identified with a specific precision and the steering angle or the yaw rate is not more than an upper limit value which allows for recognition of the own vehicle being travelling straight.

When the save condition is determined as not being satisfied in S120, the process returns to S110 and the observation point data in the subsequent cycle is obtained. On the other hand, when the save condition is determined as being satisfied in S120, the signal processing unit 30 selects one of the observation point data obtained in S110 to which processes (S140 to S220), which will be described later, are not performed (S130). The selected observation point data is hereinafter referred to as a target observation point data, and the observation point indicated by the target observation point data is hereinafter referred to as a target observation point.

Then, the signal processing unit 30 determines whether the target observation point is a wall candidate (S140). Specifically, the target observation point is determined as a wall candidate when a relative speed Vs indicated in the target observation point data is 0 (that is, a speed zero observation point). Further, in this determination, the condition may include whether the target observation point exists in the vicinity of the vehicle (for example, within an average distance between the vehicle which is travelling in a leftmost lane of a freeway and a soundproof wall) or in a predetermined area (for example, ±20 degrees) with respect to the azimuth which corresponds to 90 degrees in the vehicle coordinate system (that is, in this example, 50 degrees in the radar coordinate system).

When the target observation point is determined as not being a wall candidate in S140, the processes in S150 to S210, which will be described later, are skipped. On the other hand, when the target observation point is determined as a wall candidate in S140, the signal processing unit 30 stores the target observation point data as a wall candidate observation point data in the memory (S150).

Then, the signal processing unit 30 counts up a wall candidate observation points counter (S160). The wall candidate observation points counter initializes the count value (zero-clear) on startup of the process.

Then, the signal processing unit 30 determines whether the number of wall candidate observation points (that is, the count value of the wall candidate observation points counter) reaches a predetermined specified value N (S170).

Figure 4:
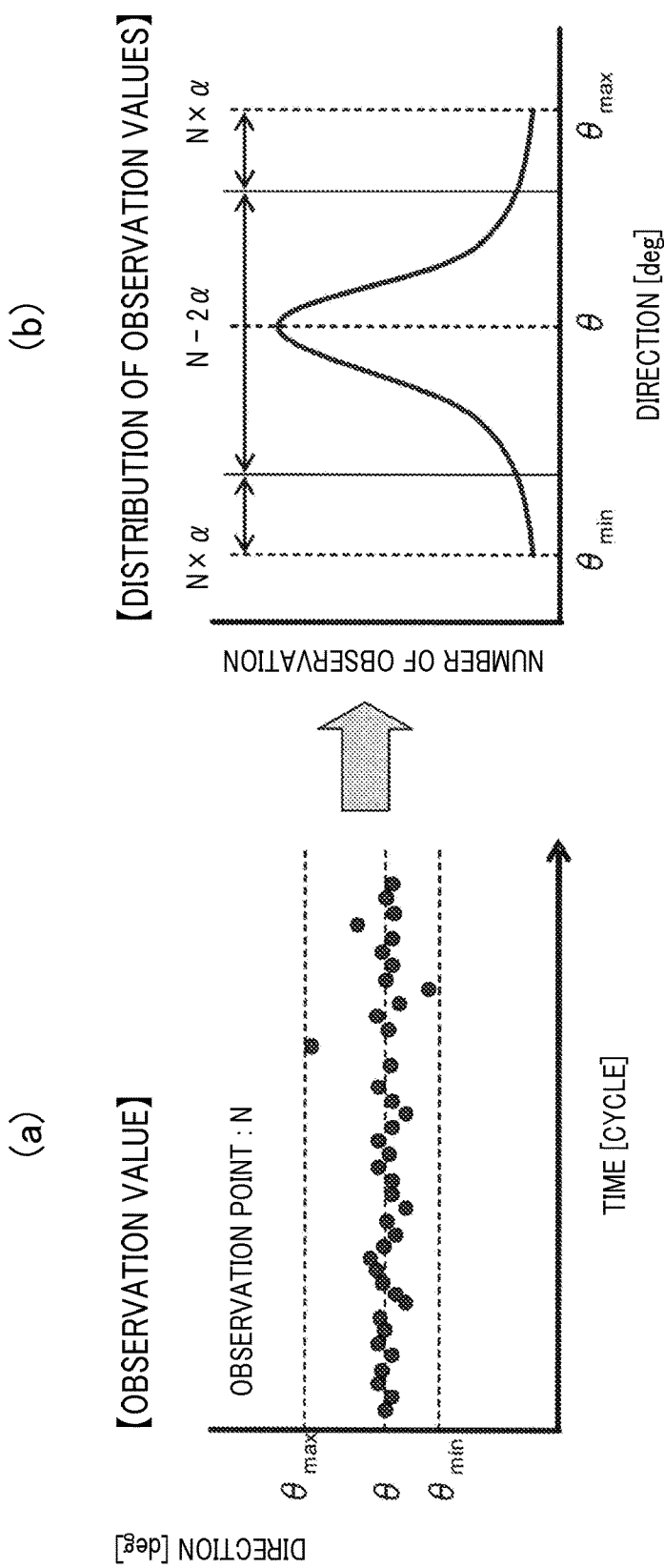
FIG. 4 is an explanatory view of observation values of trimmed mean and their distribution.

When the number of wall candidates is determined as not reaching the specified value N in S170, the processes in S180 to S210, which will be described later, are skipped. On the other hand, when the number of wall candidate observation points are determined as reaching the specified value N in S170, the signal processing unit 30 calculates a wall azimuth estimation value φWall, that is, a wall azimuth observed in the radar coordinate system on the basis of the wall candidate observation point data stored in the memory by using the robust estimation method (S180). In this example, a trimmed mean, which is one of the robust estimation methods is used. Specifically, focusing the azimuth of the wall candidate observation points and assuming that the azimuth of the wall candidate observation point data distribute in the range of θmin to θmax, a wall azimuth estimation value φWall is obtained by discarding N×α (0<α<1, for example, α=0.2) data on the Δmax end of the azimuth and N×α data on the θmin end of the azimuth (see FIG. 4) and calculating a mean value of azimuth of the remaining (N−2α) wall candidate observation point data. The method of calculating the wall azimuth estimation value φWall is not limited to the trimmed mean, and any other robust estimation methods may also be used.

Then, the signal processing unit 30 calculates a mounting angle θInst by using the wall azimuth estimation value φWall calculated in S180 (S190). Specifically, θInst is obtained from an equation (3) by taking the wall azimuth in the vehicle coordinate system as θWall (=90 degrees) (see FIG. 3).

$$\theta Inst = \theta Wall - \phi Wall \quad (3)$$

Then, the signal processing unit 30 calculates an axis deviation amount ΔθInst by obtaining a difference between the mounting angle θInst calculated by the equation (3) and a predetermined correct mounting angle (S200).

Then, the signal processing unit 30 clears the stored value of the wall candidate observation point data and initializes the count value of the wall candidate observation points counter (S210).

Then, the signal processing unit 30 determines whether all the observation point data obtained in S110 are selected in S130 (S220). If there is any unselected observation point data in S220, the process returns to S130 and the processes of S130 to S210 are repeated. If all the observation point data are selected, the process returns to S110 and the observation point data of the subsequent cycle are obtained.

The obtained mounting angle θInst and the axis deviation amount ΔθInst may be displayed on a display screen in the vehicle, or an alarm may be generated to a passenger of the vehicle when the axis deviation amount ΔθInst excesses a predetermined allowable amount. Alternatively, an optical axis deviation may be automatically corrected by using the mounting angle θInst when the positional information of the observation point detected by the signal processing unit 30 is converted into the vehicle coordinate system.

<Effect>

In this embodiment, the radar sensor 10 is mounted on the vehicle so that 90 degree azimuth of the vehicle coordinate system is included in the sensing area. The signal processing unit 30 extracts an observation point at which the relative speed is 0 (speed zero observation point) as a wall candidate observation point on the basis of waves reflected by a wall which exists at the 90 degrees azimuth from the observation point data detected by the radar sensor, and the mounting angle of the radar sensor is obtained from the azimuth of the wall candidate observation point.

In other words, since the azimuth of the wall candidate observation point detected by the radar sensor 10 is represented by the radar coordinate system on the basis of the optical axis, and the 90 degree azimuth is represented by the vehicle coordinate system on the basis of the front-back direction of the vehicle, a corresponding relationship between the radar coordinate system and the vehicle coordinate system (the mounting angle of the radar sensor 10) can be specified.

Further, since the observation point based on the object which exists at the 90 degree azimuth is taken as the speed zero observation point regardless of the height of the point at which the radar wave is reflected, the mounting angle, and thus the optical axis deviation amount of the radar sensor 10 can be detected in a stable manner.

Further, in this embodiment, the speed zero observation point which is obtained when the own vehicle is travelling straight and at a speed not less than a lower limit speed and is located within an allowable distance from the own vehicle is taken as the wall candidate observation point, and, the azimuth of the wall candidate observation point is calculated by using a trimmed mean, which is one of robust estimation methods, on the basis of observation results of the azimuth of a plurality of wall candidate observation points. Accordingly, a speed zero observation point based on an object other than an object (such as a soundproof wall) which is located in the 90 degree direction of the own vehicle can be excluded, and the azimuth of the wall candidate observation point can be obtained with high precision.

Other Embodiments

Although the embodiments of the present disclosure have been described above, the present disclosure is not limited to the above embodiments and various modifications can be made. For example, a function of one element may be divided into a plurality of elements, or a function of a plurality of elements may be integrated into one element. Further, at least part of the configuration in the above embodiments may be replaced with a known configuration having a similar function.

REFERENCE SIGNS LIST 1 vehicle control system
10 radar sensor
20 vehicle state detection sensors
30 signal processing unit
40 control execution unit

The invention claimed is:

1. An on-vehicle radar apparatus comprising:
a radar sensor which is mounted on a vehicle such that a sensing area includes 90 degree azimuth which is a direction of 90 degrees relative to a front-back direction of the vehicle, transmitting and receiving a radar wave thereby detecting at least a relative speed to an observation point at which the radar wave is reflected in the sensing area and an azimuth at which the observation point is located; and
a mounting angle calculation section that calculates a mounting angle of the radar sensor from an azimuth of a speed zero observation point, the speed zero observation point being the observation point with a relative speed of zero at the 90 degree azimuth among the observation points detected by the radar sensor.

2. The on-vehicle radar apparatus according to claim 1, wherein the radar sensor uses an FMCW wave as the radar wave.

3. The on-vehicle radar apparatus according to claim 1, wherein the mounting angle calculation section applies a robust estimation to calculation of the azimuth of the speed zero observation point.

4. The on-vehicle radar apparatus according to claim 3, wherein the mounting angle calculation section uses a trimmed mean as the robust estimation.

5. The on-vehicle radar apparatus according to claim 1, wherein the mounting angle calculation section uses the azimuth of the speed zero observation point detected during travelling at a predetermined lower limit speed or more for calculation of the mounting angle.

6. The on-vehicle radar apparatus according to claim 1, wherein the mounting angle calculation section uses the azimuth of the speed zero observation point which is detected when an own vehicle is travelling straight for calculation of the mounting angle.

* * * * *